Sept. 27, 1949.  C. E. YOUNG  2,482,821
VISUAL TUNING INDICATOR FOR FREQUENCY
MODULATION SIGNALS
Filed Nov. 21, 1947
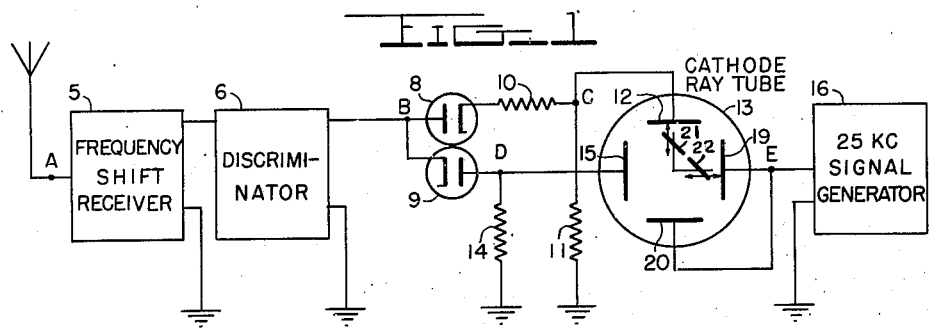
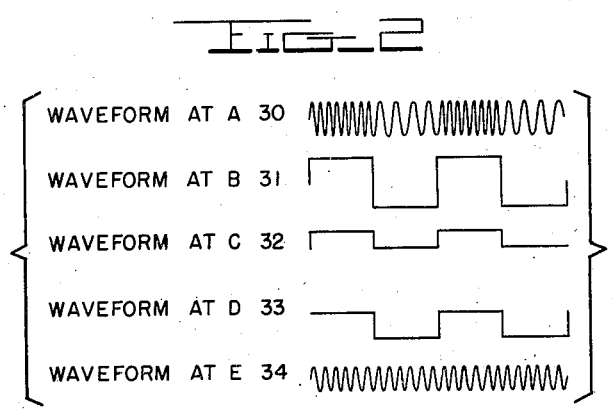
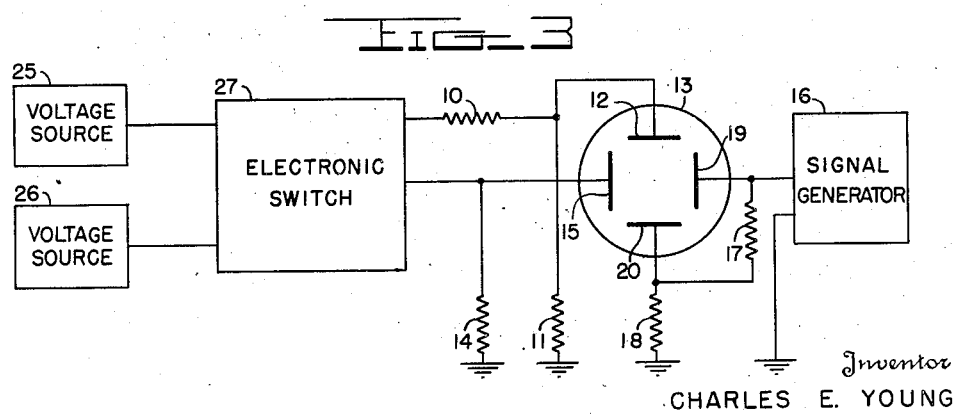
Inventor
CHARLES E. YOUNG
By
Attorney Patented Sept. 27, 1949

2,482,821

UNITED STATES PATENT OFFICE 2,482,821

VISUAL TUNING INDICATOR FOR FREQUENCY MODULATION SIGNALS

Charles E. Young, Washington, D. C.

Application November 21, 1947, Serial No. 787,265

6 Claims. (Cl. 250—40)

(Granted under the act of March 3, 1883, as amended April 30, 1928; 370 O. G. 757)

This invention relates generally to apparatus for indicating simultaneously the amplitudes of two voltage components, and more particularly, to a tuning indicator for frequency shift receivers.

In the operation of communication systems employing a signal which is alternately shifted between two different frequencies, such as wireless teletype systems, the receiver therefor should be tuned to the center of the frequency shifted signal. In such systems, one frequency is usually designated "mark" and the other "space." It will be apparent to those skilled in the art that the mark and space outputs from the receiver discriminator will be opposite in sense but equal in amplitude when the receiver is tuned to the center frequency.

It follows that this field of the communication art would be greatly benefited by a simple device which would accurately and clearly indicate equality in amplitude between the mark and space discriminator outputs. It also follows that such a device would conceivably have many applications in the field of electronics for determining relative amplitude between two distinct voltages or between two voltage components of a single signal.

It therefore is an object of this invention to provide apparatus for indicating the relative amplitude of two voltages.

It is another object of this invention to provide apparatus for indicating the relative amplitude of two components of a composite signal.

It is another object of this invention to provide a tuning indicator for a frequency shift receiver.

Other objects and features of this invention will be apparent from the following description and accompanying drawings, wherein:

Fig. 1 is a schematic diagram partly in block of a preferred embodiment of this invention;

Fig. 2 is a series of voltage waveforms taken at selected points in the circuit of Fig. 1, and Fig. 3 is an alternate embodiment of this invention.

Briefly, this invention provides a simple tuning indicator for a frequency shift receiver by dividing the discriminator output according to sense and applying the resultant signals to adjacent plates of a cathode ray tube. The sweep thus produced is stationary at the points of maximum deflection for the duration of each signal. This sweep is obliquely modulated by applying a relatively high frequency signal to the remaining deflection plates in phase to produce a heavy line at the two points of maximum sweep deflection. When the receiver is tuned to center frequency the absolute amplitude of each sense of the discriminator output is equal and the two heavy lines will be collinear.

Referring now to Fig. 1 in detail, a frequency shift receiver is indicated by block 5 and its discriminator by block 6. The output from the discriminator is applied to a pair of diodes 8 and 9 arranged in reverse polarity. Discriminator output signals having a positive sense are passed by diode 8 and developed across a voltage divider consisting of resistances 10 and 11.

The junction (point C) of said resistances 10 and 11 is connected to one vertical deflection plate 12 of a cathode ray tube 13. Discriminator output signals having a negative sense are passed by diode 9 and developed across resistance 14. These negative signals are applied to a horizontal deflection plate 15 of said cathode ray tube 13. The application of these signals produces an angular or L-shaped pattern on the screen of the cathode ray tube since signals will not be impressed on plates 12 and 15 simultaneously. The positive signal on plate 12 will draw the electron beam toward it or vertically upward from its center position, the negative signal on plate 15 will repel the beam horizontally to the right from its center position. The beam will remain at its maximum deflection position for the duration of the deflecting signal because of the square shape of said signals.

The L-shaped sweep produced from the discriminator output is obliquely modulated by the output from a 25 kc. signal generator 16. The frequency of signal generator 16 is arbitrarily chosen and is not critical, but it should be relatively high with respect to the shifting rate of the received signal. The output of said generator 16 is applied to the remaining horizontal deflection plate 19 and the remaining vertical deflection plate 20 in parallel. Since adjacent plates 19 and 20 are driven in phase, they will cooperate to attract and repel the cathode ray beam at an angle of 45° with respect to each plate.

With a square wave output from discriminator 6, the pattern produced by the modulation signals applied to plates 19 and 20 will be more intense at either end of the L-shaped sweep since the sweep remains at its end positions for a relatively long period. Therefore, a 45 degree line 21 and 22 will appear at each end of the L-shaped pattern from the discriminator output. Since the modulation voltage impresses a deflecting force normal to an imaginary line bisecting the L-shaped sweep, the two said 45° lines 21 and 22 will be collinear if the two arms of the L are of equal length, or in other words, if the deflection force at plate 12 equals that at 15.

Since it is desired that this condition obtain when the positive sense discriminator signals equal those of negative sense, the aforementioned voltage divider 10 and 11 is used to apply discriminator signals to the vertical deflection plate 12. Resistances 10 and 11 are suitably chosen to compensate for the difference in deflection sensitivity between plates 12 and 15.

The difference in deflection sensitivity of opposite plates for most cathode ray tubes is not large enough to seriously affect the accuracy of the indication, hence satisfactory operation may be had with resistance 10 omitted and point C tied directly to the cathode of diode 8. Also, most cathode ray tubes have a slightly curved surface and it has been found that the two above mentioned 45° modulation lines 21 and 22 will not appear exactly parallel. However, their variance from a parallel relation is slight and for the purpose of this discussion the lines will be considered parallel.

The length of said modulation lines is determined by the amplitude of the signal generator output. Preferably, the amplitude should be adjusted so that adjacent ends of the modulation lines will just meet when the lines are collinear.

A representative pattern is shown on the face of cathode ray tube 13 in Fig. 1. Arrows have been added to the pattern to show the direction of movement of the heavy modulation lines 21 and 22 in response to changes in the deflection forces applied to plates 12 and 15. With the indicating device of this invention it becomes a simple matter to tune the receiver to the center frequency, the operation being simply to tune the receiver until the lines become collinear. Furthermore, the character of the received signal may easily be determined with this indicator. The relative deviation is readily shown and other types of signals such as CW and MCW may be readily distinguished from the desired frequency shifted signal.

It will be seen that the above mentioned modulation lines will always maintain the same parallel relation although their positions will vary in accordance with the length of the respective arms of the L-shaped sweep. If the deflection force on plate 15 is greater than that on plate 12, the horizontal arm of the L produced by plate 15 will be longer than the vertical arm produced by plate 12. Under these conditions the lower modulation line 22 will be out of line to the right in respect to the upper modulation line 21. Conversely, if the deflection force on plate 15 is less than that on plate 12, the lower modulation line will be out of line to the left with respect to the upper one. By observing the relative position of the two modulation lines, the relative amplitude of the deflection forces on plates 15 and 12 may be determined. The relative amplitude of the potentials applied to plates 15 and 12 may thus be determined.

The series of waveforms shown in Fig. 2, to which reference is now made, illustrate the function of the various components of Fig. 1. Waveform 30 represents the frequency shifted signal applied to the input (point A) of frequency shift receiver 5. Waveform 31 is the output (point B) of discriminator 6 when the receiver is properly tuned to the center frequency. It will be noted that waveform 31 is a square wave since waveform 30 shifts abruptly between two different frequencies.

Waveform 32 is the positive component of the discriminator output and waveform 33 is the negative component. It will be noted that the amplitude of these two waveforms is not the same, this is because of the voltage divider 10 and 11. Waveform 34 represents the output from the signal generator 16 at point E.

As indicated by these waveforms, the circuit of Fig. 1 may be used to determine the relative amplitude of the positive and negative excursions of any rectangular voltage shift, such as waveform 31, by applying same to point B of Fig. 1 in place of the discriminator output.

The utility of this invention may easily be extended to amplitude comparison of voltages, such as voltage pulses, from separate sources. A circuit arranged for this purpose is shown in Fig. 3. A pair of voltage sources 25 and 26 feed an electronic switch 27 which connects to adjacent plates 12 and 15 of cathode ray tube 13 in the same manner as discriminator 6 and diodes 8 and 9 of Fig. 1. The voltage sources 25 and 26 may be sources of recurrent pulses, sources of D. C. potential, or one may be a pulse source and the other a D. C. source. If source 25 produces recurrent pulses and source 26 a variable D. C. potential, and if source 26 is adjusted in amplitude until a collinear pattern appears on the screen of cathode ray tube 13, said amplitude then equals that of the pulses from source 25. Pulse amplitude is thus easily determined by measuring or calibrating the output from source 26.

The electronic switch 27 may be any of a number of known switching circuits, such as that disclosed in "Ultra High Frequency Techniques," by Brainerd, Koehler, Reich, and Woodruff. The frequency of signal generator 16 in Fig. 3 should be high with respect to the switching rate of the electronic switch 27.

It will be noted in Fig. 3 that the output of signal generator 16 has been developed across a voltage divider 17 and 18 with the output applied directly to plate 19 and through the divider to plate 20.

This voltage divider may be used to provide additional compensation for the difference in deflection sensitivity of the pairs of deflection plates with cathode ray tubes which do not have two deflection plates internally interconnected.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A device for indicating the relative amplitude of the positive and negative excursions of a rectangular shaped voltage wave comprising, a cathode ray tube having four deflection plates in quadrature relation, means including a pair of unilateral impedances for applying the positive excursions to one deflection plate and the negative excursions to an adjacent deflection plate of said cathode ray tube so as to produce an angular sweep, a signal generating means, and means coupling said signal generating means to the remaining plates of said cathode ray tube so as to obliquely modulate said angular sweep.

2. A device for indicating the relative amplitude of the positive and negative excursions of a rectangular shaped voltage wave comprising, a cathode ray tube having four deflection plates spaced in quadrature relation, a pair of oppositely poled unilateral impedances fed by said voltage wave operative to separate the positive excursions and the negative excursions thereof, means respectively coupling each of said unilateral impedances to one of two adjacent plates of said cathode ray tube, a signal generating means having an output, and means coupling the output of said signal generating means in phase to the remaining deflection plates of said cathode ray tube.

3. A device for indicating the relative amplitude of the positive and negative excursions of a rectangular shaped voltage wave comprising, a cathode ray tube having four deflection plates spaced in quadrature relation, a pair of oppositely poled unilateral impedances fed by said voltage wave operative to separate the positive excursions and the negative excursions thereof, means respectively coupling each of said unilateral impedances to one of two adjacent plates of said cathode ray tube, a signal generating means having an output whose period is small with respect to that of said rectangular wave, and means coupling the output of said signal generating means in phase to the remaining deflection plates of said cathode ray tube.

4. A device for indicating the relative amplitude of the positive and negative excursions of a rectangular shaped voltage wave comprising, a cathode ray tube having four deflection plates spaced in quadrature relation, a pair of oppositely poled unilateral impedances fed by said voltage wave operative to separate the positive excursions and the negative excursions thereof, means respectively coupling each of said unilateral impedances to one of two adjacent plates of said cathode ray tube, a signal generating means having an output whose period is small with respect to that of said rectangular wave, means coupling the output of said signal generating means in phase to the remaining deflection plates of said cathode ray tube, and compensating means associated with each of a pair of opposite deflection plates operative to compensate for the difference in deflection sensitivity between said plates and their respective adjacent plates.

5. In a receiver for the reception of signals alternately shifted between two predetermined frequencies, a tuning indicator comprising, a discriminator having an output circuit, a cathode ray tube having a pair of horizontal and a pair of vertical deflection plates, a pair of unilateral impedance elements coupled in opposed relation to said discriminator output circuit, means coupling one of said unilateral impedances to one horizontal deflection plate and means including a voltage divider coupling the other unilateral impedance to one vertical deflection plate, signal generating means producing an output having a high frequency relative to the shifting rate of the received signal, and means coupling in phase the output of said signal generating means directly to the other horizontal deflection plate and through a voltage divider to the other vertical deflection plate.

6. A device for comparing voltage amplitudes comprising, a cathode ray tube having four deflection plates spaced in quadrature relation, means for alternately applying the voltages to be compared to two adjacent plates of said cathode ray tube, and means for applying a signal of frequency higher than the alternation rate to the remaining cathode ray tube plates.

CHARLES E. YOUNG.

REFERENCES CITED

The following references are of record in the file of this patent:

UNITED STATES PATENTS

| Number | Name | Date |
|---|---|---|
| 2,194,516 | Anderson | Mar. 26, 1940 |
| 2,271,964 | Wilson | Feb. 3, 1942 |